United States Patent [19]
de Simone et al.

[11] Patent Number: 5,610,207
[45] Date of Patent: Mar. 11, 1997

[54] MANUFACTURE OF LOW DENSITY PRODUCTS CONTAINING RECYCLED FOAM

[75] Inventors: Valérie de Simone, Saint Mandé; Gérard Courveille, Pont Saint Maxence, both of France

[73] Assignee: ARCO Chemical Technology, L. P., Greenville, Del.

[21] Appl. No.: 448,849

[22] Filed: May 24, 1995

[30] Foreign Application Priority Data

May 25, 1994 [GB] United Kingdom .................. 9410460

[51] Int. Cl.$^6$ .............................. C08J 9/32; C08K 3/20; C08L 75/00; C08G 18/00
[52] U.S. Cl. ....................... 523/218; 428/304.4; 264/123; 264/241; 264/321; 264/DIG. 7; 521/54; 521/155; 524/590; 524/198
[58] Field of Search .................... 521/51, 155; 523/218; 524/590, 198; 264/123, 321, 241, DIG. 7; 428/304.4

[56] References Cited

U.S. PATENT DOCUMENTS 3,401,128  9/1968  Terry ........................................ 521/54
4,438,221  3/1984  Fracalossi et al. ........................ 521/55

*Primary Examiner*—Paul R. Michl
*Assistant Examiner*—Patrick Niland
*Attorney, Agent, or Firm*—Dennis M. Kozak

[57] ABSTRACT

A process for the manufacture of re-bonded foam products is disclosed. The process comprises mixing a liquid comprising polyol with a liquid comprising polyisocyanate in the presence of small pieces of foam, consolidating the mixture, and causing the polyol and polyisocyanate to react and bond the coated pieces together.

30 Claims, No Drawings

MANUFACTURE OF LOW DENSITY PRODUCTS CONTAINING RECYCLED FOAM

This invention relates to the formation of low density products containing recycled foam plastics.

It is known to form relatively low density products from scrap plastics foam. In accordance with one method, described in U.S. Pat. No. 5,185,380, scrap polyurethane foam is converted to small pieces which are then consolidated under heat and pressure and pressed to form a sheet. However, temperatures of at least 150° C. and pressures of at least 50 bar are required and it is necessary first to separate the foam pieces from hard foreign constituents such as metals and pvc and also from constituents that melt below 150° C., prior to consolidation and pressing.

Other methods proposed for employing scrap polyurethane foam involve converting it into small pieces, coating the pieces with a binder and then placing them in a mould under conditions to cause the binder to cure. Binders that have been proposed include thermoplastic resin (WO92/EP/1298) polyester/epoxy mixture (EP-A-528456), polyurethane foam prepolymer (JP-A-63017013) urethane resin (JP-A-60031928) and MDI and/or urethane polymer (JP-A-57034926). The products are sometimes called rebonded foams.

Mixtures of polyol and polyisocyanate have also been proposed as the binder in the production of rebonded foams. JP-A-57-100048 describes the production of insulating panels with a foam core which is prepared by crushing rigid foamed polyurethane into chips, coating the chips with an adhesive comprising two-pack urethane adhesive diluted with methyl ethyl ketone, packing the coated chips between a pair of metal sheets and then applying heat (100° C.) and pressure. JP-A-61-272249 describes coating chips of waste polyurethane foam with a mixture of polyol, polyisocyanate, catalyst and silicone oil, packing the coated chips into a mould and causing the mixture to foam by the introduction of steam into the mould, to form a foam containing a fused mass of the chips. DMP, Durvoobrab, Mebelna, Prom-st 1982, 25(1) pages 18 to 21 describes the formation of rebonded soft polyurethane foam blocks for upholstery by coating polyurethane foam scraps with polyol and polyisocyanate, applying pressure to the coated particles and curing over a period of 30–40 minutes.

The production of rebonded polyurethane foam using a binder comprising polyol and polyisocyanate has the problem that if an active polyol/polyisocyanate mixture is used, there may be insufficient time to complete the coating of the chips and subsequent moulding before the mixture becomes too viscous. On the other hand, if a less reactive mixture is used, long cure times are required unless significant heat is applied, usually with temperatures of 100° C. or more. Long cure times and heat are both costly and negate the advantages of using a low-cost material such as scrap or waste foam.

The object of the present invention is to overcome this problem. By means of the present invention, rebonded foam products are obtainable within a few minutes at temperatures substantially below 100° C. Moreover the products exhibit excellent cohesion and acceptable physical properties.

According to the present invention, there is provided a process for the manufacture of a re-bonded foam product, the process comprising:

(a) mixing a liquid comprising polyol with a liquid comprising polyisocyanate in the presence of small pieces of foam;

(b) consolidating the mixture; and (c) causing or allowing the polyol and polyisocyanate to react and bond the coated pieces together.

Thus the fundamental difference between the process of the present invention and the prior art processes is that the polyol and the polyisocyanate are mixed in the presence of the foam pieces; surprisingly this resolves the problems associated with the prior art processes.

Step (a) of the process of the present invention may be accomplished in a variety of ways. In one suitable process a first portion of small pieces of foam is coated with a liquid comprising polyol and this is mixed with a second portion of small pieces of foam which have been coated with a liquid comprising polyisocyanate.

In one alternative process the small pieces of foam are coated with the liquid comprising polyol and the coated pieces are then contacted with the liquid comprising polyisocyanate. In a second alternative process the small pieces of foam are coated with the liquid comprising polyisocyanate and the coated pieces are then contacted with the liquid comprising polyol. In a third alternative process the pieces of foam are coated with the liquid comprising polyol and the liquid comprising polyisocyanate simultaneously. However this process is not preferred.

The products of the invention show excellent adhesion of the coated pieces to each other and a density increase which can be as little as 10 kg/m$^3$ or less, more than the density of the foam pieces themselves. Thus, by use of low density foam, products having densities as low as 30 kg/m$^3$ may be obtained. For low density applications, preferred densities are in the range 40 to 60 kg/m$^3$; however higher densities can also be achieved, e.g. of 300 kg/m$^3$ or even more, by the application of pressure to the mixture during consolidation.

If the mixture is applied to a surface prior to step (v), excellent adhesion of the rebonded loam product to that surface is achievable. Thus, in one preferred embodiment, the mixture is placed between two layers of material before step (c), whereby to form a laminate with a core of rebonded foam. The coated pieces bond well not only to each other but also to the layers. While a wide variety of natural or synthetic materials may be used for the outer layers, e.g. metal, wood, cork, plastics, tissue and woven or unwoven fabrics, e.g. carpet backing preferably at least one, and more preferably both, of the layers comprise foam plastics material, e.g. polyurethane foam. One preferred combination is for both the outer layers and the loam pieces to be flexible polyurethane loam since the product can then be made to visually resemble virgin polyurethane foam and to have closely similar properties.

Thus, the invention also provides a laminate having a core layer comprising pieces of flexible polyurethane foam bonded together and to each of two outer layers of flexible polyurethane foam, on opposed sides of the core layer, by a binder obtained by reaction of a polyol with a polyisocyanate.

It has been found that where the pieces of foam are derived from waste derived from substantially the same foam as that forming the outer layers of the laminate, laminate can be produced having an overall density and physical properties, especially dynamic fatigue properties and compression set, which are close to those of the said foam. Thus the product has the potential to be used as an economic substitute for conventional flexible polyurethane in many applications, e.g. mattresses.

While the preferred foam material for use in the invention is polyurethane foam, and especially scrap or waste polyurethane foam, a wide variety of other foam materials may also be used, including polyester foams, latex foams and pvc foams, and the foams may be rigid or flexible. It has been found surprisingly that the process will also tolerate the presence of other materials, e.g. rubbery materials such as latex, natural materials such as leather, fibrous materials such as hair, felt and woven textiles, and synthetic materials such as synthetic leather. Thus, scrap foam from such sources as vehicle upholstery may be employed without having to ensure that it has been completely separated from associated materials.

The size of the foam pieces and the manner in which they are formed are not especially critical; in general it is preferred that they are in the range 0.5 to 5 mm in size but larger or smaller sizes are also acceptable. However, where the foam is flexible polyurethane foam the use of the smaller sizes results in a rebonded foam product which more closely resembles the original foam. One suitable method of obtaining the pieces is to subject scrap or waste from the action of high speed rotating knives. In general, the longer the material is exposed to the action of the knives, the smaller the average size of the resultant pieces.

The natures of the polyol and polyisocyanate are not critical: if the viscosity of the chosen polyol or polyisocyanate is too high to readily coat the particles, it may be warmed to reduce the viscosity or mixed with a diluent which will not interfere with the polyurethane-forming reaction. A solid reactant may be dissolved in a suitable diluent for use in the method. For example a volatile diluent may be employed which is then vaporised before the two portions of particles are mixed together. However, an important advantage of the invention is that reactive components may be used whereby the reaction may take place at room temperature or only slightly elevated temperature e.g. below 100° C.

The polyol may be a diol, triol, tetrol or a polyol containing more than four hydroxyl groups. Preferably it is a polyether such as is obtainable by the reactions of one or more alkylene oxides with an initiator comprising an organic molecule containing two or more reactive hydrogen atoms. Examples of initiators are polyhydric alcohols, alkylamines, alkanolamines, aromatic amines, polyhydric phenols, resins of phenol, aniline and mixed phenol aniline. Mannich condensates and mixtures thereof. Specific examples are ethylene glycol, propylene glycol, butane-1,4-diol, glycerol, trimethylolpropane, sugars such as sucrose, sorbitol, methylglucosides, triethanol amine, diethanolamine, ethylene diamine and bisphenol-A. The alkylene oxide will normally have 2 to 4 carbon atoms, as in ethylene oxide, propylene oxide and butane oxide with ethylene oxide and propylene oxide being preferred. The oxides may be mixed on addition or may be added sequentially to form blocks or caps. Preferred polyols are polyoxyalkylene polyols derived from propylene oxide, or mixtures of propylene oxide and ethylene oxide, and which are oxyethylene capped, and polyoxyalkylated derivatives of initiators containing at least one active hydrogen atom attached to an amino nitrogen atom, especially those derived from propylene oxide, or a mixture of propylene oxide and ethylene oxide, and which are oxyethylene capped. Examples of particularly preferred polyols are those identified as Polyols A, B and D below.

Typical aromatic polyisocyanates include, but are not limited to, m-phenylene diisocyanate, p-phenylene diisocyanate, polymethylene polyphenyl-isocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)-methane, bis(3-methyl-4-isocyanatophenyl)methane, and 4,4-diphenylpropane diisocyanate. Suitable aliphatic diisocyanates would include isophorone diisocyanate, hexamethylene diisocyanate, and methylene-bis-cyclohexylisocyanate.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl-polyamines, which are conventionally produced by the reaction of formaldehyde and primary aromatic amines, such as aniline, in the presence of hydrochloric acid and/or other acidic catalysts.

While essentially any polyisocyanate may be used provided it can be applied as a coating either as such or in a suitable diluent, the preferred compounds for availability and reactivity are the aromatic compounds, particularly TDI (toluene diisocyanate), MDI (4,4-diisocyanatodiphenyl methane) and polymeric MDI.

The polyol and polyisocyanate are preferably provided in amounts such that the ratio of isocyanate groups to hydroxyl groups is at least 1:1 and more preferably from about 1:1 to 3:1; the excess isocyanate is curable by atmospheric humidity.

Where step (a) of the process comprises coating a first portion of small pieces of foam with a liquid comprising polyol and mixing this with a second portion of small pieces of foam which have been coated with a liquid comprising polyisocyanate, any suitable means may be employed for coating the portions of foam pieces with the polyol and polyisocyanate, respectively. In one preferred method the pieces are tumbled in a container containing the polyol or polyisocyanate, respectively, in liquid form. The two coated portions are then mixed together and the mixture consolidated and exposed to conditions which will cause the polyol and polyisocyanate to react and cure.

Where step (a) of the process comprises coating the small pieces of foam with one of the liquid comprising polyol and the liquid comprising polyisocyanate and then coating the pieces with the other one of the liquid comprising polyol and the liquid comprising polyisocyanate, any suitable means may be employed for coating the foam pieces with the first liquid and any suitable means may be employed for coating the pieces with the second liquid. In one preferred method the pieces are tumbled or stirred in a container containing the first liquid and the second liquid is sprayed into the container. The mixture is then consolidated and exposed to conditions which will cause the polyol and polyisocyanate to react and cure.

The extent of consolidation required is merely that which ensures that the coated pieces are packed closely together with substantially no spaces between them and thus only light pressure is required. In general pressures of a few pounds per square inch are adequate but higher pressures may be used if desired, e.g. to control the density or height of the product. Surprisingly, excellent bonding is achieved and products with very acceptable physical properties are obtainable even at very low applied pressures.

It will be understood that other additives employed in the formation of polyurethanes may be included with one and/or other of the polyol and polyisocyanate, e.g. catalysts, fire retardants, viscosity modifiers, heat and light stabilisers and the like. Solid fillers may also be included provided they do not prevent adequate coating of the foam pieces or the subsequent reaction of the polyol with the polyisocyanate.

Examples of catalysts are:

(a) Tertiary amines such as trimethylamine, triethylamine, N-methylmorpholine, N-ethylmorpholine, N,N-dimethylbenzylamine, N,N-dimethylethanolamine, N,N,N',N'-tetramethyl-1,3-butanediamine, N,N-dimethylpiperazine, 1,4-diazobicyclo[2.2.2]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

Chelates of various metals such as those which can be obtained from acetylacetone, benzoylacetone, trifluoroacetyl acetone, ethyl acetoacetate, salicyclaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals. Al, Sn, Pb, Mn, Co, Ni, and Cu, including, for example, sodium acetate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 and 2.0 parts by weight.

In one embodiment, the mixture may be consolidated in a mould where the reaction between the polyol and polyisocyanate takes place. However, the process is also adaptable to continuous operation, e.g. by depositing the mixture in controlled manner on to a band advancing past the supply point and causing the reaction to take place downstream of the supply point. In one preferred embodiment, the mixture may be applied to one band which is intended to form one face of a laminate for which the mixture forms a core, and a second band may be applied to the top of the mixture to form another outer face of the laminate. The laminate may then be passed between rollers to control its thickness and density prior to completing the reaction between the polyol and polyisocyanate.

The density of the resultant rebonded foam material depends upon a number of factors but primarily the density and size of the foam pieces, the weight ratio of foam pieces to polyol and polyisocyanate, and the degree of compaction applied to the mixture during consolidation. In general, the larger the size of the pieces and the lower their density, the lower the density of the product; likewise the higher the weight ratio of binder (polyol plus polyisocyanate) to foam pieces, the higher the density of the product. The weight ratio of the binder to foam pieces may vary within wide limits, depending, inter alia, upon the density of the foam pieces but in general will be in the range of 10:90 to 40:60; however the higher ratios may result in longer curing times due to increased thickness of the film coating the pieces, or incomplete curing.

While any suitable temperature may be employed for effecting the reaction between the polyol and polyisocyanate, an important advantage of the process is that high temperatures, such as requiring the use of steam, may be avoided. In general, higher temperatures result in shorter cure times and temperatures of about 80° C. or less are adequate for most purposes.

Cure time depends on the choice of polyol and polyisocyanate, the amounts used relative to the amount of foam pieces and the temperature of cure but are normally in the range 5 to 15 minutes. It is important to avoid too rapid cure, since this can result in loss of the strength of the bond between the foam pieces.

The invention is illustrated but in no way limited by the following Examples in which all parts are expressed as parts by weight.

EXAMPLES 1 TO 11

In a series of experiments, a measured weight of flexible pollure^Ane foam having a density of 22.3 kg/m³ and which had been cut into small pieces by the action of rotating knives in an apparatus similar to a domestic blender was divided into two portions. The first portion was coated with a measured amount of a mixture of 93 parts by weight of a polyol and 7 parts by weight of dibutyl tin dilaurate (DBTDL) as catalyst by tumbling the pieces with the mixture in a vessel. The second portion was coated with a measured amount of TDI by tumbling the pieces in a vessel containing the TDI. (TDI is a commercially available mixture of toluene diisocyanate isomers).

A sheet of the same flexible polyurethane foam as that from which the polyurethane foam pieces were derived was placed in the bottom of an open-topped rectangular parallelepiped mould having the same internal length and width as the length and width of the sheet and the internal surfaces of which had been coated with a mould release agent. The two coated portions of foam pieces were mixed together thoroughly in a mixing vessel and the mixture was then discharged on top of the sheet of polyurethane in the mould and covered with a second sheet of the same flexible polyurethane foam and having the same length and width as the first. A top plate which is a sliding fit in the mould was then fitted over the top sheet and light hand pressure was applied to consolidate the mixture lying between the sheets in the mould. The mould was then placed in an oven at 80° C. for seven minutes, thereafter removed and allowed to cool. The foam laminate was then removed from the mould and tested for its physical properties. The results are reported in Table 1. The corresponding properties for the foam employed for the top and bottom sheets are reported in Example 12.

Polyol A is propoxylated ethylene diamine end capped with ethylene oxide and with a molecular weight of 3750.

Polyol B is propoxylated monopropylene glycol end capped with ethylene oxide and with a molecular weight of 4000.

In all of Examples 1 to 11, the amount of foam pieces as a percentage of the total amount of polyol, polyisocyanate and foam pieces, by weight, is approximately 80.

TABLE 1

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Polyol: Polyol A/DBTDL (93/7) (parts by weight) | 10.5 | 3.6 | 1.6 | 7.5 | 2.4 | 0.9 | 4.1 | 1.65 | — | — | — | |
| Polyol: Polyol B/DBTDL (93/7) (parts) | — | — | — | — | — | — | — | — | 10.7 | 3.5 | 1.4 | |
| Polyisocyanate (parts) | 3.5 | 1.2 | 0.52 | 2.5 | 0.8 | 0.3 | 1.4 | 0.55 | 3.6 | 1.2 | 0.47 | |
| Weight of chopped foam (parts) | 58 | 19.2 | 8.3 | 41 | 12.8 | 4.8 | 22 | 8.8 | 57.4 | 19 | 7.44 | |
| Total weight of foam sheets (parts) | 8 | 8 | 5.6 | 9 | 8 | 6 | 4.5 | 5 | 8.3 | 8.3 | 6.7 | |
| Final thickness of laminate (cm) | 5 | 2 | 1 | 5 | 2 | 1 | 2 | 1 | 5 | 2 | 1 | |
| Density of laminate (kg/m³) | 40 | 40 | 40 | 30 | 30 | 30 | 40 | 40 | 40 | 40 | 40 | |
| CLD NFT 56110 (kPa) | | | | | | | | | | | | |
| at 25% | 1.8 | | | 1.0 | | | | | 1.6 | | | 2.5 |
| at 40% | 2.5 | | | 1.8 | | | | | 2.2 | | | 2.7 |
| at 50% | 3.6 | | | 2.3 | | | | | 3.2 | | | 3.1 |
| at 65% | 7.9 | | | 4.2 | | | | | 6.9 | | | 4.6 |
| return at 50% | 2.1 | | | 1.3 | | | | | 1.8 | | | 2.2 |
| return at 40% | 1.4 | | | 0.9 | | | | | 1.2 | | | 1.8 |
| *Dry Compression set 50% - 70° C. - 22 h NFT 56112 | 55 | | | 64 | | | | | 36 | | | 2 |
| Tensile strength NFT 56108 (kPa) | | 89 | | | 74 | | | 75 | | | 76 | 121 |
| Elongation NFT 56108 (%) | | 106 | | | 232 | | | 100 | | | 206 | 253 |
| Tear strength NFT 56109 (Nm⁻¹) | 4.6 | | | | 3.6 | | 3 | | | 2.9 | | 6.8 |

*Dry Compression Set (NFT 56112) is measure as follows: 100 mm × 100 mm × 50 mm samples of foam without skin are compressed at 70% of their initial height for 22 hours at 70° C.

The value for Compression Set $= \frac{H_0 - H_1}{H_0 - H_c} \times 100\%$ where $H_0$ = initial foam height, $H_1$ + foam height at compression, $H_c$ = foam height after release of compression

EXAMPLES 13 TO 15

The process described for Examples 1 to 11 was repeated but using flexible polyurethane foam having a density of 34.7 kg/m³. The results are reported in Table 2. The corresponding properties for the virgin foam employed for the sheets and pieces are reported in Example 16.

TABLE 2

| | Example | | | |
|---|---|---|---|---|
| | 13 | 14 | 15 | 16 |
| Polyol: Polyol A/DBTDL (93/7) (parts) | 10.4 | 3.1 | 1.4 | |
| Polyisocyanate (parts) | 3.4 | 1 | 0.48 | |
| Weight of chopped foam (parts) | 55.2 | 16.5 | 7.7 | |
| Weight of preformed sheets (parts) | 11 | 11 | 6.4 | |
| Total final thickness of laminate (cm) | 5 | 2 | 1 | |
| Density of laminate (kg/m³) | 40 | 40 | 40 | |
| CLD NFT 56110 (kPa) | | | | |
| at 25% | 1.75 | | | 4.9 |
| at 40% | 3.3 | | | 5.4 |
| at 50% | 4.7 | | | 6.3 |
| at 65% | 8.8 | | | 9.8 |
| return at 50% | 3 | | | 4.8 |
| return at 40% | 1.8 | | | 4 |
| Dry Compression set 50% - 70° C. - 22 h NFT 56112 | 30 | | | 2 |
| Tensile strength NFT 56108 (kPa) | | | 70 | 118 |
| Elongation NFT 56108 (%) | | | 77 | 114 |
| Tear strength NFT 56109 (Nm⁻¹) | | | | 3.4 |

EXAMPLES 17 TO 19

The process of Examples 1 to 11 was repeated but without using the preformed foam sheets. Thus, the product was a block of rebonded flexible polyurethane foam.

TABLE 3

| | Examples | | |
|---|---|---|---|
| | 17 | 18 | 19 |
| Polyol: Polyol A/DBTDL (93/7) (parts) | 12 | 4.8 | 2.4 |
| Polyisocyanate (parts) | 4 | 1.6 | 0.8 |
| Weight of chopped foam (parts) | 64 | 25.6 | 12.8 |
| Final thickness of rebonded foam slab (cm) | 5 | 2 | 1 |
| Density of rebonded foam stab (kg/m³) | 40 | 40 | 40 |
| Dry Compression set 50% - 70° C. - 22 h NFT 56112 | | | |
| Tensile strength NFT 56108 (kPa) | | | 32 |
| Elongation NFT 56108 (%) | | | 68 |
| Tear strength NFT 56109 (Nm⁻¹) | | | 2.6 |

EXAMPLE 20

The process of Example 13 was repeated but with larger pieces of chopped foam. The properties of the resultant laminate are as follows

| | |
|---|---|
| CLD NFT 56110 (kPa) | |
| at 25% | 2.5 |
| at 40% | 3.9 |
| at 50% | 5.2 |
| at 65% | 10 |
| return at 50% | 3.5 |
| return at 40% | 2.5 |
| Dry Compression set 50% - 70° C. - 22 hr (NFT 56112) | 20 |
| Tensile strength NFT 56108 (kPa) | 74 |
| Elongation NFT 56108 (%) | 232 |

EXAMPLES 21–32

A series of further experiments was carried out using the procedure of Examples 17 to 19 to illustrate the effect of varying the density of the foam (Examples 21–26), and varying the size of the foam pieces (Examples 27 to 30). In each Example, the foam pieces were obtained by comminuting waste foam by rotating knives in an apparatus similar to a domestic blender. The average final size of the pieces varied with the time of comminution, the longer times giving smaller average sizes. The time of comminution was as follows:

Examples 21 to 26: 10 seconds

Examples 27 to 29: 7 seconds

Example 30: 15 seconds

Examples 31 to 32: 10 seconds.

In Examples 30 and 31 the ratio of loam pieces to binder (polyol plus polyisocyanate plus catalyst) was reduced to 2:1 instead of 4:1 and the time in the oven was increased from 7 to 10 minutes. Further decreasing the ratio to 57:43 resulted in incomplete cure. The results are set out in Table 4.

Polyol D is propoxylated glycerol capped with ethylene oxide and having a molecular weight of 4,800.

Polyol E is propoxylated/ethoxylated glycerol with random ethylene oxide and propylene oxide units, capped with ethylene oxide and having a molecular weight of 3,000.

Polyol F is propoxylated glycerin capped with ethylene oxide and having a molecular weight of 4,000.

Polyol G is propoxylated glycerin capped with ethylene oxide and having a molecular weight of 4,800.

In Example 37, the polyol employed was a mixture of 80% Polyol F and 20% Polyol G.

TABLE 4

| | Example | | | | | | | | | | | |
|---|---|---|---|---|---|---|---|---|---|---|---|---|
| | 21 | 22 | 23 | 24 | 25 | 26 | 27 | 28 | 29 | 30 | 31 | 32 |
| Polyol: Polyol A/DBTDL (93/7) (parts) | 8.1 | 10.5 | 3.1 | 15.5 | 3.8 | 19 | 3.1 | 15.5 | 4.8 | 24 | 6.2 | 31 |
| Polyisocyanate (parts) | 0.7 | 3.5 | 1.1 | 5.2 | 1.3 | 6.5 | 1.1 | 5.2 | 1.6 | 8 | 2.2 | 10.4 |
| Weight of foam pieces (parts) | 11.5 | 57.5 | 16.5 | 82.5 | 20.3 | 101.5 | 16.5 | 82.5 | 25.6 | 128 | 16.5 | 82.5 |
| Density of foam pieces (g/l) | 25.7 | 25.7 | 41.6 | 41.6 | 53.3 | 53.3 | 41.6 | 41.6 | 41.6 | 41.6 | 41.6 | 41.6 |
| Density of rebonded foam slab (g/l) | 38.6 | 36.2 | 56.7 | 52.1 | 66 | 65.2 | 54.7 | 50.9 | 97 | 80.4 | 72.8 | 61.5 |
| Thickness of rebonded foam slab (cm) | 1 | 5 | 1 | 5 | 1 | 5 | 1 | 5 | 1 | 5 | 1 | 5 |
| Tensile strength NFT 56108 (kPa) | 17 | | 28 | | 23 | | 26 | | 58 | | 42 | |
| Elongation NFT 56108 (%) | 55 | | 70 | | 65 | | 54 | | 83 | | 85 | |
| CLD NFT 56110 (kPa) | | | | | | | | | | | | |
| at 25% | | 1.26 | | 1.68 | | 1.79 | | 2.25 | | 3 | | 2.62 |
| at 40% | | 2.29 | | 3.95 | | 3.4 | | 3.6 | | 5.60 | | 4.62 |
| at 50% | | 3.49 | | 4.97 | | 5.39 | | 5 | | 8.70 | | 6.96 |
| at 65% | | 7.90 | | 9.54 | | 12.85 | | 10.40 | | 21.00 | | 15.7 |
| return at 50% | | 1.82 | | 2.68 | | 3.55 | | 3.30 | | 5.20 | | 4.16 |
| return at 40% | | 1.10 | | 1.73 | | 2.12 | | 2.30 | | 3.10 | | 2.61 |
| Loss of hardness (50%)* NFT 56114 | | | | | | | | | | | | |
| 30 minutes | | 41.1 | | 25.8 | | 21 | | 25.1 | | 25.1 | | 30.2 |
| 24 hours | | 21 | | 15.1 | | 9 | | 15.5 | | 14 | | 19 |
| Height loss* NFT 56114 | | | | | | | | | | | | |
| 30 minutes | | 12.3 | | 5.4 | | 4.1 | | 3.8 | | 25.1 | | 5 |
| 24 hours | | 4.1 | | 2.6 | | 1.1 | | 1.6 | | 14 | | 2.4 |

*Samples employed for the foam hardness (CLD) test are compressed to 50% of their initial height 200,000 times at a frequency of 3 Hz. Foam height and hardness are measured after 30 minutes of recovery and after 24 hours of recovery and are expressed as a percentage of the original hardness and height.

EXAMPLES 33–38

The procedure of Examples 1 to 11 was repeated with varying polyols and to produce finished laminates comprising 2 outer layers each 2 cm thick of preformed flexible polyurethane foam and a 1 cm thick core of rebonded polyurethane foam pieces. The polyol was employed as a 93/7 wt/wt mixture with dibutyl tin dilaurate, the mixture being employed in amount of 3.41 parts by weight with 0.75 parts by weight of TDI. The time in the oven was increased from 7 to 15 minutes. The density of the foam employed for the pieces and the outer layers was 42.7 kg/m³ and the pieces were comminuted for 5 seconds. The results are set out in Table 5.

Polyol C is propoxylated sorbitol capped with ethylene oxide and having a molecular weight of 10,000.

TABLE 5

| | Example | | | | | |
|---|---|---|---|---|---|---|
| | 33 | 34 | 35* | 36 | 37 | 38 |
| Polyol | A | C | B | D | F/G | E |
| Polyol/DBDTL (parts) | 3.1 | 3.41 | 3.41 | 3.41 | 3.1 | 3.1 |
| Polyisocyanate (parts) | 1.1 | 0.55 | 0.55 | 0.75 | 0.8 | 1.1 |
| Density of foam laminate product (kg/m³) | 42.5 | 41.2 | 40.8 | 41.5 | 41.7 | 42.1 |
| CLD NFT 56110 (kPa) | | | | | | |
| at 25% | 4.45 | 4.63 | 4.50 | 4.7 | 4.51 | 4.40 |
| at 40% | 5.01 | 5.19 | 5.10 | 5.20 | 5.13 | 5.04 |
| at 50% | 5.88 | 6.09 | 5.90 | 6.08 | 6.00 | 5.94 |
| at 65% | 9.33 | 9.56 | 9.10 | 9.41 | 9.44 | 9.45 |
| return at 50% | 4.67 | 4.84 | 4.70 | 4.83 | 4.82 | 4.79 |
| return at 40% | 3.82 | 3.97 | 3.86 | 3.96 | 3.93 | 3.91 |
| Loss of hardness | | | | | | |

TABLE 5-continued

| | Example | | | | | |
|---|---|---|---|---|---|---|
| | 33 | 34 | 35* | 36 | 37 | 38 |
| (50%) NFT 56114 | | | | | | |
| 30 minutes | 16.7 | 20.2 | 19.9 | 19.9 | 19.1 | 21.2 |
| 24 hours | 12 | 16.1 | 15 | 16.1 | 16.2 | 17 |
| Height loss NFT 56114 | | | | | | |
| 30 minutes | 2.4 | 2.2 | 2.2 | 2.0 | 2.61 | 2.6 |
| 24 hours | 0.53 | 0.93 | 1.5 | 1.1 | 1.1 | 1.3 |
| Compression Set (70° C., 22 h 70%) NFT 56112 | 7.8 | 4.3 | 4.9 | 4.9 | 5.2 | 5.5 |

*Cure was incomplete.

By way of comparison the properties of the foam from which the pieces were derived are set to below

| CLD (kPa) | |
|---|---|
| at 25% | 4.13 |
| at 40% | 4.83 |
| at 50% | 5.73 |
| at 65% | 9.01 |
| return at 50% | 4.71 |
| return at 40% | 3.86 |
| Tensile (kPa) | 74 |
| Elongation (%) | 92 |
| Tear (N/cm) | 3.38 |
| Compression set (70° C., 70%, 22 hours) | 3 |

EXAMPLE 39

Example 36 was repeated but using a polyurethane foam having a density of 25.7 kg/m$^3$ and smaller foam pieces (comminution time equals 10 seconds instead of 5 seconds), and with the amounts of polyol, polyisocyanate and foam pieces each reduced by approximately one third. The results are as follows:

| | Example 36 | Example 39 |
|---|---|---|
| Density of laminate (kg/m$^3$) | 41.5 | 26.3 |
| CLD NFT 56110 (kPa) | | |
| at 25% | 4.70 | 1.75 |
| at 40% | 5.20 | 2.20 |
| at 50% | 6.08 | 2.77 |
| at 65% | 9.41 | 4.82 |
| return at 50% | 4.83 | 1.92 |
| return at 40% | 3.96 | 1.45 |
| Loss of hardness (50%) NFT 56114 | | |
| 30 minutes | 19.9 | 25.9 |
| 24 hours | 16.1 | 15.1 |
| Height loss NFT 56114 | | |
| 30 minutes | 2.0 | 5.64 |
| 24 hours | 1.1 | 2.62 |
| Compression set (70° C., 22 hr, 70%) (NFT 56112) | 4.9 | |

EXAMPLES 40–42

Example 36 was repeated but varying the time in the oven. In Example 42, the polyol was Polyol A in an amount of 3.1 parts by weight and the amount of polyisocyanate employed is increased from 0.75 to 1.1 parts by weight. The results are set out in Table 6. Curing was incomplete in Examples 41 and 42.

TABLE 6

| | Example | | | |
|---|---|---|---|---|
| | 36 | 40 | 41 | 42 |
| Weight of foam pieces (parts) | 16.5 | | | |
| Density of foam laminate product (kg/m$^3$) | 41.5 | 42.45 | | 42.2 |
| Time in oven (minutes) | 15 | 10 | 5 | 5 |
| CLD NFT 56110 (kPa) | | | | |
| at 25% | | | 4.61 | 4.46 |
| at 40% | | | 5.15 | 5.03 |
| at 50% | | | 6.01 | 5.96 |
| at 65% | | | 9.44 | 9.64 |
| return at 50% | | | 4.83 | 4.74 |
| return at 40% | | | 3.96 | 3.84 |
| Loss of hardness (50%) NFT 56114 | | | | |
| 30 minutes | | | 19.64 | 19.8 |
| 24 hours | | | 15.6 | 16.05 |
| Height loss NFT 56114 | | | | |
| 30 minutes | | | 2.77 | 2.74 |
| 24 hours | | | 1.47 | 1.27 |
| Compression Set (70° C., 22 h 70%) NFT 56112 | 4.9 | | | |

EXAMPLES 43 AND 44

Example 36 was repeated but using different, thicknesses of preformed polyurethane foam for the two outer layers. The results are set out in Table 7.

TABLE 7

| | Example | | |
|---|---|---|---|
| | 36 | 43 | 44 |
| Polyol: Polyol D/DBTDL (93/7) (parts) | 3.41 | 6.82 | 10.23 |
| Polyisocyanate (parts) | 0.75 | 1.5 | 2.25 |
| Thickness of each foam layer | 2 of 2 cm | 2 of 1.5 cm | 2 of 1 cm |
| Amount of foam pieces used (parts) | 16.5 | 33 | 49.5 |
| Density of laminate (kg/m$^3$) | 41.5 | 44.95 | 46.5 |
| Thickness of laminate (cm) | | 5 | |
| Weight of foam pieces as percentage of total weight of laminate | 20% | 40% | 60% |
| CLD NFT 56110 (kPa) | | | |
| at 25% | | 3.64 | 2.26 |
| at 40% | | 4.86 | 4.46 |
| at 50% | | 5.65 | 5.13 |
| at 65% | | 9.28 | 8.57 |
| return at 50% | | 4.37 | 3.79 |
| return at 40% | | 3.54 | 2.88 |
| Loss of hardness (50%) NFT 56114 | | | |
| 30 minutes | | 21.3 | 21.9 |
| 24 hours | | 16.6 | 16.6 |
| Height loss NFT 56114 | | | |
| 30 minutes | | 3.15 | 4.27 |
| 24 hours | | 1.31 | 2.02 |
| Compression Set (70° C., 22 h 70%) NFT 56112 | 4.9 | | |

EXAMPLES 45–50

A series of experiments were carried out following the procedure of Examples 17 to 19 but with 15 minutes residence in the oven. The foam pieces were obtained by subjecting scrap foam to 5 seconds comminution. The materials employed and the results obtained are set out in Table 8

TABLE 8

|  | Example | | | | | |
| --- | --- | --- | --- | --- | --- | --- |
|  | 45 | 46 | 47 | 48 | 49 | 50 |
| Polyol: Polyol D/DBTDL (93/7) (parts) | — | — | 3.41 | 6.82 | — | — |
| Polyol: Polyol A/DBTDL (93/7) (parts) | 3.1 | 6.2 | — | — | — | — |
| Polyol: Polyol B/Polyol D/DBTDL (46.5/46.5/7) (parts) | — | — | — | — | 3.41 | 6.82 |
| Polyisocyanate (parts) | 1.1 | 2.2 | 0.75 | 1.5 | 0.75 | 1.5 |
| Thickness of rebonded foam slab (cm) | 1 | 2 | 1 | 2 | 1 | 2 |
| Density of foam pieces (kg/m$^3$) | | | 42.7 | | | |
| Weight of foam pieces (parts) | 10.5 | 23 | 16.5 | 33 | 16.5 | 33 |
| Density of rebonded foam slab (kg/m$^3$) | | | 51.5 | | | |
| Tensile strength NFT 56108 (kPa) | 17.6 | | 11.4 | | 5.8 | |
| Elongation NFT 56108 (%) | 48.5 | | 32 | | 20 | |
| Tear strength ([NFT 56109] N/m | | 108.5 | | 48.5 | | |

EXAMPLES 51–63

A series of experiments was carried out with different polyisocyanates. The foam pieces were obtained by comminution of scrap foam for 5 seconds. The materials and conditions employed and the results obtained are set out in Table 9. The oven temperature was 80° C. and the residence time 15 minutes. Examples 51–54, 56–58 and 60–62 employed the procedure of Example 17–19. Examples 55, 59 and 63 employed the procedure or Examples 1 to 11 to form a laminate with a 1 cm thick core of rebonded polyurethane foam between two outer layers of preformed polyurethane each 2 cm thick. The foam from which the pieces were derived was the same as that employed for the two outer layers.

AA is toluene diisocyanate (TDI)

BB is a liquid mixture of pure MDI (bis[4-isocyanatophenyl methane]) and carbodiimide CC is modified MDI (prepolymer)

DD is crude MDI

TABLE 9

|  | Example | | | | | | | | | | | | |
| --- | --- | --- | --- | --- | --- | --- | --- | --- | --- | --- | --- | --- | --- |
|  | 51 | 52 | 53 | 54 | 55 | 56 | 57 | 58 | 59 | 60 | 61 | 62 | 63 |
| Polyol: Polyol D/DBTDL (93/7) (parts) | 17.1 | 2.7 | 5.4 | 13.5 | 2.7 | 3.1 | 6.2 | 15.5 | 3.1 | 3 | 6 | 15 | 3 |
| Polyisocyanate |  |  |  |  |  |  |  |  |  |  |  |  |  |
| AA (parts) | 3.8 |  |  |  |  |  |  |  |  |  |  |  |  |
| BB (parts) |  |  |  |  |  | 1.2 | 2.4 | 1.2 | 2.4 |  |  |  |  |
| CC (parts) |  |  |  |  |  |  |  |  |  | 1.3 | 2.6 | 6.5 | 1.3 |
| DD (parts) |  | 1.5 | 3 | 7 | 1.5 |  |  |  |  |  |  |  |  |
| Density of foam pieces (kg/m$^3$) |  |  |  |  |  |  | 42.7 |  |  |  |  |  |  |
| Weight of foam pieces (parts) | 82.5 | 16.5 | 33 | 82.5 | 16.5 | 16.5 | 33 | 82.5 | 16.5 | 16.5 | 33 | 82.5 | 16.5 |
| Density of product (kg/m$^3$) | 40.9 | 52.5 | 51.8 | 50.6 | 42.4 | 53.5 | 52.5 | 51.8 | 42.5 | 52 | 51.2 | 52.1 | 42.4 |
| Thickness of product (cm) | 5 | 1 | 2 | 5 | 5 | 1 | 2 | 5 | 5 | 1 | 2 | 5 | 5 |
| Tensile strength NFT 56108 (kPa) |  | 6.23 |  |  |  |  | 12.7 |  |  | 9.6 |  |  |  |
| Elongation NFT 56108 (%) |  | 17.2 |  |  |  |  | 41.5 |  |  | 42 |  |  |  |
| Tear strength NFT 56109 N/m |  |  | 69.3 |  |  |  | 64.2 |  |  | 115 |  |  |  |
| CLD NFT 56110 (kPa) |  |  |  |  |  |  |  |  |  |  |  |  |  |
| at 25% |  |  |  |  |  | 4.2 |  | 1.52 |  |  |  | 1.45 |  |
| at 40% |  |  |  |  |  | 4.8 |  | 2.7 |  |  |  | 2.4 |  |
| at 50% |  |  |  |  |  | 5.7 |  | 3.9 |  |  |  | 3.5 |  |
| at 65% |  |  |  |  |  | 9.2 |  | 8.3 |  |  |  | 7.5 |  |
| return at 50% |  |  |  |  |  | 4.6 |  | 2.4 |  |  |  | 2.3 |  |
| return at 40% |  |  |  |  |  | 3.7 |  | 1.6 |  |  |  | 1.5 |  |
| Loss of hardness (50%) NFT 56114 |  |  |  |  |  |  |  |  |  |  |  |  |  |
| 30 minutes |  |  |  |  |  | 19 |  | 33 |  |  |  | 30 |  |
| 24 hours |  |  |  |  |  | 12.9 |  | 21.9 |  |  |  | 14.4 |  |
| Height loss of hardness (50%) NFT 56114 |  |  |  |  |  |  |  |  |  |  |  |  |  |
| 30 minutes |  |  |  |  |  | 2.4 |  | 4.6 |  |  |  | 5.1 |  |
| 24 hours |  |  |  |  |  | 0.5 |  | 0.9 |  |  |  | 0.5 |  |

EXAMPLES 64–67

A series of experiments was carried out according to the procedure of Example 51 with varying concentrations of polyisocyanate relative to polyol. The details are set out in Table 10. In Examples 64 and 65 the bonding was inadequate.

TABLE 10

|  | Example | | | |
| --- | --- | --- | --- | --- |
|  | 64 | 65 | 66 | 67 |
| Polyol: Polyol D/DBTDL (93/7) (parts) | 3.9 | 7.8 | 3.2 | 6.4 |
| Polyisocyanate (AA) (parts) | 0.43 | 0.86 | 1.08 | 2.2 |
| Density of foam pieces (kg/m$^3$) | | 42.7 | | |
| Weight of foam pieces (parts) | 16.5 | 33 | 16.5 | 33 |
| Density of products (kg/m$^3$) | | | | |
| Thickness of products (cm) | 1 | 2 | 1 | 2 |
| Tensile strength NFT 56108 (kPa) | | | 17.6 | |
| Elongation NFT 56108 (%) | | | 61.7 | |
| Tear strength NFT 56109 N/m | | | | 134 |

EXAMPLES 68 TO 70

The process of Example 64 was repeated but increasing the quantities of materials employed and the pressure applied to the mixture in the mould, whereby to obtain products of increasing density. The results are recorded in Table 11.

TABLE 11

| Example | 68 | 69 | 70 |
| --- | --- | --- | --- |
| Polyol (parts) | 6.5 | 13 | 26 |
| Polyisocyanate (parts) | 1.5 | 3 | 6 |
| Weight of foam pieces (parts) | 32 | 64 | 128 |
| Thickness of products (cm) | 1 | 1 | 1 |
| Density of products (kg/m$^3$) | 100 | 200 | 300 |

EXAMPLE 71

In a series of experiments, the procedure of Example 1 was repeated but using small pieces of pvc foam, hard polyurethane foam and latex rubber foam respectively, and strongly bonded products were obtained. In a further experiment, flexible polyurethane foam pieces contaminated with horsehair, latex rubber and rubberized fibers were employed with similar results.

EXAMPLES 72–76

A further series of experiments were carried out following the procedure of Examples 45 to 50. In Examples 72 and 73, a mixture of foam pieces was used comprising 50% by weight or pieces that had been obtained by comminution for 5 seconds and 50% by weight of pieces that had been obtained by comminution for 10 seconds. In Examples 74 to 76, the latter pieces were replaced by pieces that had been obtained by comminution for 30 seconds. The results are set out in Table 12.

TABLE 12

|  | Example | | | | |
| --- | --- | --- | --- | --- | --- |
|  | 72 | 73 | 74 | 75 | 76 |
| Polyol: Polyol D/DBTDL (93/7) (parts) | 3.41 | 6.82 | 3.41 | 5.5 | 11 |
| Polyisocyanate (AA) (parts) | 0.75 | 1.5 | 0.75 | 1.2 | 2.45 |
| Density of foam pieces (kg/m$^3$) | | | 42.7 | | |
| Weight of foam pieces (parts) | 16.5 | 33 | 16.5 | 23 | 46 |
| Density of products (kg/m$^3$) | | | | | |
| Thickness of products (cm) | 1 | 2 | 1 | 1 | 2 |
| Tensile strength NFT 56108 (kPa) | 11.7 | | | 21.1 | |
| Elongation NFT 56108 (%) | 48.8 | | | 50.7 | |
| Tear strength NFT 56109 N/m | | 38.5 | | | 130 |

EXAMPLES 77 TO 79

In a first experiment (Example 77) a laminate was formed from two outer layers of polyurethane foam, each 1.5 cm thick and having a density of 42.7 kg/m$^3$ and a 2 cm core of rebonded foam made from pieces of the same foam. In two further experiments (Examples 78 and 79), the outer layers were omitted and a rebonded foam slab was obtained from the same foam pieces. In each case, the oven temperature was 80° C. and the residence time 15 minutes. The pieces were prepared by comminuting the scrap foam in the manner described for Examples 1 to 11 for 5 seconds. The details of the materials employed and results obtained are set out in Table 13.

TABLE 13

|  | Example | | |
| --- | --- | --- | --- |
|  | 77 | 78 | 79 |
| Polyol: Polyol D/DBTDL (93/7) (parts) | 5.9 | 17.1 | 17.1 |
| Polyisocyanate | | | |
| AA (parts) | 2.5 | | |
| CC (parts) | | 3.8 | 3.8 |
| Weight of foam pieces (parts) | 33 | 67 | 67 |
| Density of product (kg/m$^3$) | 45 | 44.8 | 52.1 |
| Thickness of product (cm) | 5 | 5 | 5 |
| CLD NFT 56110 (kPa) | | | |
| at 25% | 3.2 | 1.15 | 1.8 |
| at 40% | 4.4 | 2 | 2.8 |
| at 50% | 5.2 | 2.8 | 3.9 |
| at 65% | 8.7 | 5.7 | 8.1 |
| return at 50% | 4.1 | 1.8 | 2.6 |
| return at 40% | 3.3 | 1.2 | 1.8 |
| Loss of hardness (50%) NFT 56114 | | | |
| 30 minutes | 21.1 | 26.2 | 25.9 |
| 24 hours | 15.5 | 17 | 16.9 |
| Height loss of hardness (50%) NFT 56114 | | | |
| 30 minutes | 3.1 | 4.6 | 4.2 |
| 24 hours | 1.3 | 1.5 | 1.5 |

EXAMPLES 80 TO 83

In Examples 80 to 82 the chopped foam pieces were treated with the liquid comprising the polyol and subsequently with the liquid comprising the polyisocyanate. In each of these examples the pieces of foam were placed in the mixer and were then sprayed with the liquid comprising the polyol. The pieces of foam were then sprayed with the liquid comprising the polyisocyanate. The coated foam was then poured into the moulds. The details of the materials employed and results obtained are set out in Table 14. Table 14 also gives the results obtained for virgin foam as Example 83 for comparison.

Similar results can be achieved when the liquid comprising the polyisocyanate is sprayed onto the foam pieces before the liquid comprising the polyol.

TABLE 14

|  | Example | | | |
| --- | --- | --- | --- | --- |
|  | 80 | 81 | 82 | 83 |
| Polyol: Polyol A | 139 | 91.5 | 45.7 | |
| Isocyanate | 136 | | | |
| Density of foam pieces (kg/m$^3$) | 19 | 19 | 19 | |
| Weight of foam pieces (parts) | 1093 | 918 | 729 | |
| Density of product (kg/m$^3$) | 50 | 40 | 30 | |
| Weight of product (g) | 1343 | 1080 | 808 | |
| CLD NFT 56110 (kPa) | | | | |
| at 25% | 3.6 | 2.5 | 2.0 | 2.3 |
| at 40% | 5.8 | 3.8 | 3.0 | 2.6 |
| at 50% | 8.7 | 5.2 | 4.0 | 2.9 |
| at 65% | 21.7 | 11.3 | 8.2 | 4.1 |
| return at 50% | 4.7 | 3.0 | 2.4 | 2.1 |
| return at 40% | 2.9 | 2.0 | 1.6 | 1.7 |
| Hysteresis | 60 | 58 | 58 | 52 |
| Sag Factor | 6 | 4.5 | 4 | 2 |
| Tear Strength NFT 56109 (N/m) | 480 | 310 | 150 | 409 |
| Tensile Strength NFT 56108 (kPa) | 48 | 46 | 15 | 97 |
| Elongation NFT 56108 (%) | 39 | 40 | 39 | 174 |
| Loss of hardness (50%) NFT 56114 | | | | |
| 30 minutes | 11 | 10 | 8 | |
| 24 hours | 5 | 2 | 2 | |
| Loss of CLD (50%) NFT 56114 | | | | |
| 30 minutes | 42 | 43 | 38 | |
| 24 hours | 29 | 26 | 26 | |
| CS (70° C., 70%, 22 hours) | 20 | 19 | 18.5 | 6 |

We claim:

1. A process for the manufacture of a re-bonded foam product, the process comprising:

(a) mixing a liquid comprising polyol with a liquid comprising polyisocyanate in the presence of small pieces of foam;

(b) consolidating the mixture; and (c) causing or allowing the polyol and polyisocyanate to react and bond the coated pieces together wherein step (a) comprises;

(i) coating a first portion of small pieces of foam with the liquid comprising polyol;

(ii) coating a second portion of small pieces of foam with the liquid comprising polyisocyanate; and (iii) mixing the coated portions together.

2. A process for the manufacture of a re-bonded foam product, the process comprising:

(a) mixing a liquid comprising polyol with a liquid comprising polyisocyanate in the presence of small pieces of foam:

(b) consolidating the mixture; and (c) causing or allowing the polyol and polyisocyanate to react and bond the coated pieces together wherein step (a) comprises:

(i) coating the small pieces of foam with the liquid comprising polyol; and (ii) contacting the coated pieces with the liquid comprising polyisocyanate.

3. A process for the manufacture of a re-bonded foam product, the process comprising:

(a) mixing a liquid comprising polyol with a liquid comprising polyisocyanate in the presence of small pieces of foam:

(b) consolidating the mixture; and (c) causing or allowing the polyol and polyisocyanate to react and bond the coated pieces together wherein step (a) comprises:

(i) coating the small pieces of foam with the liquid comprising polyisocyanate; and (ii) contacting the coated pieces with the liquid comprising polyol.

4. The process of claim 1 wherein the foam pieces are of polyurethane foam.

5. The process of claim 1 wherein the polyol comprises polyoxyalkylene polyol derived from propylene oxide, or a mixture of propylene oxide and ethylene oxide, and which is oxyethylene capped.

6. The process of claim 1 wherein the polyol is derived by polyoxyalkylation of a compound having two or more active hydrogen atoms at least one of which is attached to an amino nitrogen atom.

7. The process of claim 1 wherein the polyisocyanate is selected from TDI, MDI and polymeric MDI.

8. The process of claim 1 wherein the ratio of isocyanate groups to hydroxyl groups is in the range 1:1 to 3:1.

9. The process of claim 1 wherein the ratio of the total weight of polyol and polyisocyanate to total weight of foam pieces is in the range 10:90 to 40:60.

10. The process of claim 1 wherein prior to the reaction of the polyol and polyisocyanate, the mixture is placed between two layers of material whereby on reaction of the polyol with the polyisocyanate the foam pieces are bonded to each other and to the layers to form a laminate.

11. The process of claim 10 wherein the layers comprise flexible polyurethane foam and the foam pieces are also of flexible polyurethane foam.

12. The process of claim 1 wherein the foam pieces range from 0.5 to 5 mm in size.

13. The process of claim 2 wherein the foam pieces are of polyurethane foam.

14. The process of claim 2 wherein the polyol comprises polyoxyalkylene polyol derived from propylene oxide, or a mixture of propylene oxide and ethylene oxide, and which is oxyethylene capped.

15. The process of claim 2 wherein the polyol is derived by polyoxyalkylation of a compound having two or more active hydrogen atoms at least one of which is attached to an amino nitrogen atom.

16. The process of claim 2 wherein the polyisocyanate is selected from TDI, MDI and polymeric MDI.

17. The process of claim 2 wherein the ratio of isocyanate groups to hydroxyl groups is in the range 1:1 to 3:1.

18. The process of claim 2 wherein the ratio of the total weight of polyol and polyisocyanate to total weight of foam pieces is in the range 10:90 to 40:60.

19. The process of claim 2 wherein prior to the reaction of the polyol and polyisocyanate, the mixture is placed between two layers of material whereby on reaction of the polyol with the polyisocyanate the foam pieces are bonded to each other and to the layers to form a laminate.

20. The process of claim 2 wherein the layers comprise flexible polyurethane foam and the foam pieces are also of flexible polyurethane foam.

21. The process of claim 2 wherein the foam pieces range from 0.5 to 5 mm in size.

22. The process of claim 3 wherein the foam pieces are of polyurethane foam.

23. The process of claim 3 wherein the polyol comprises polyoxyalkylene polyol derived from propylene oxide, or a mixture of propylene oxide and ethylene oxide, and which is oxyethylene capped.

24. The process of claim 3 wherein the polyol is derived by polyoxyalkylation of a compound having two or more active hydrogen atoms at least one of which is attached to an amino nitrogen atom.

25. The process of claim 3 wherein the polyisocyanate is selected from TDI, MDI and polymeric MDI.

26. The process of claim 3 wherein the ratio of isocyanate groups to hydroxyl groups is in the range 1:1 to 3:1.

27. The process of claim 3 wherein the ratio of the total weight of polyol and polyisocyanate to total weight of foam pieces is in the range 10:90 to 40:60.

28. The process of claim 3 wherein prior to the reaction of the polyol and polyisocyanate, the mixture is placed between two layers of material whereby on reaction of the polyol with the polyisocyanate the foam pieces are bonded to each other and to the layers to form a laminate.

29. The process of claim 3 wherein the layers comprise flexible polyurethane foam and the foam pieces are also of flexible polyurethane foam.

30. The process of claim 3 wherein the foam pieces range from 0.5 to 5 mm in size.

* * * * *